UNITED STATES PATENT OFFICE.

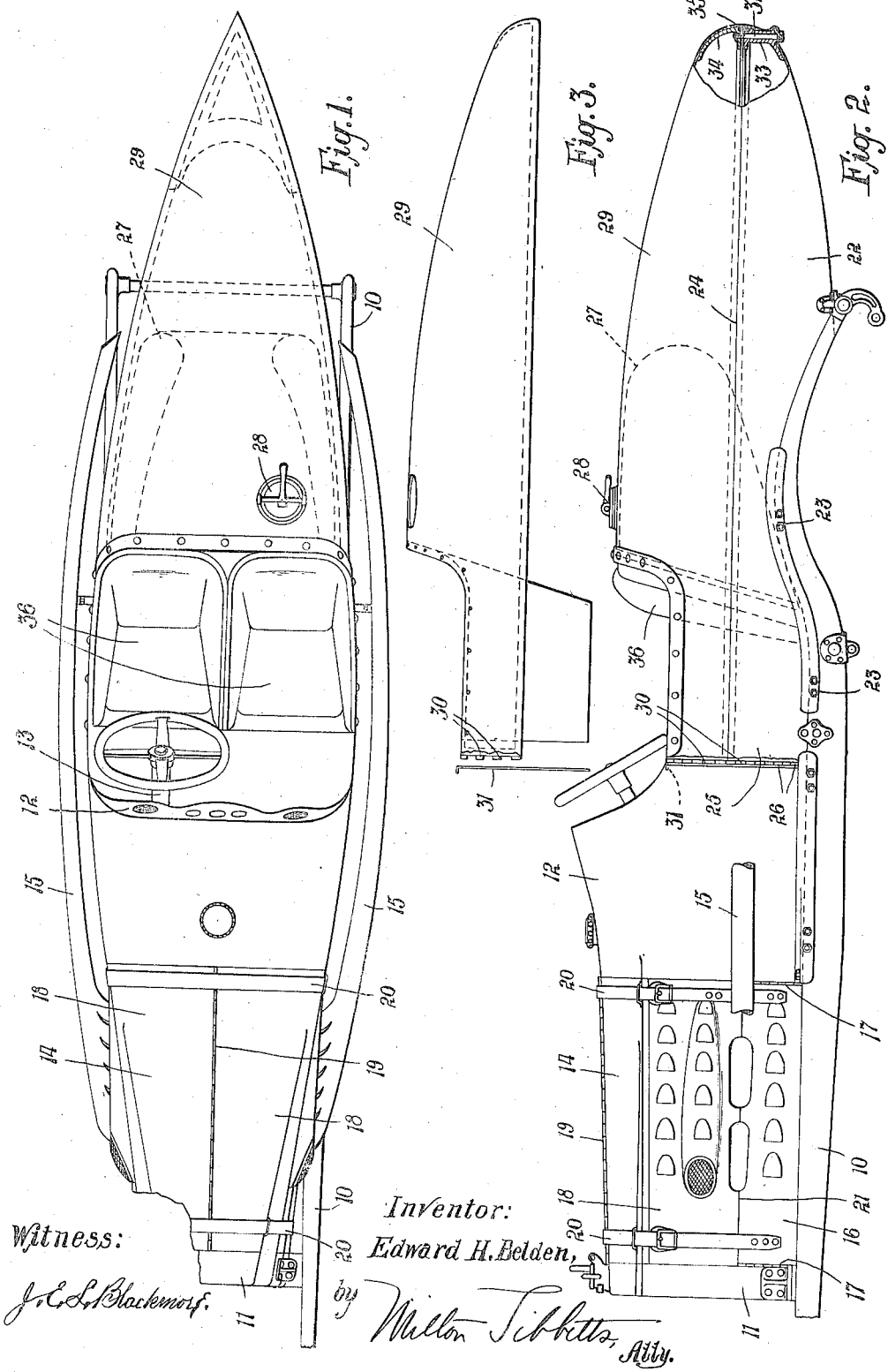

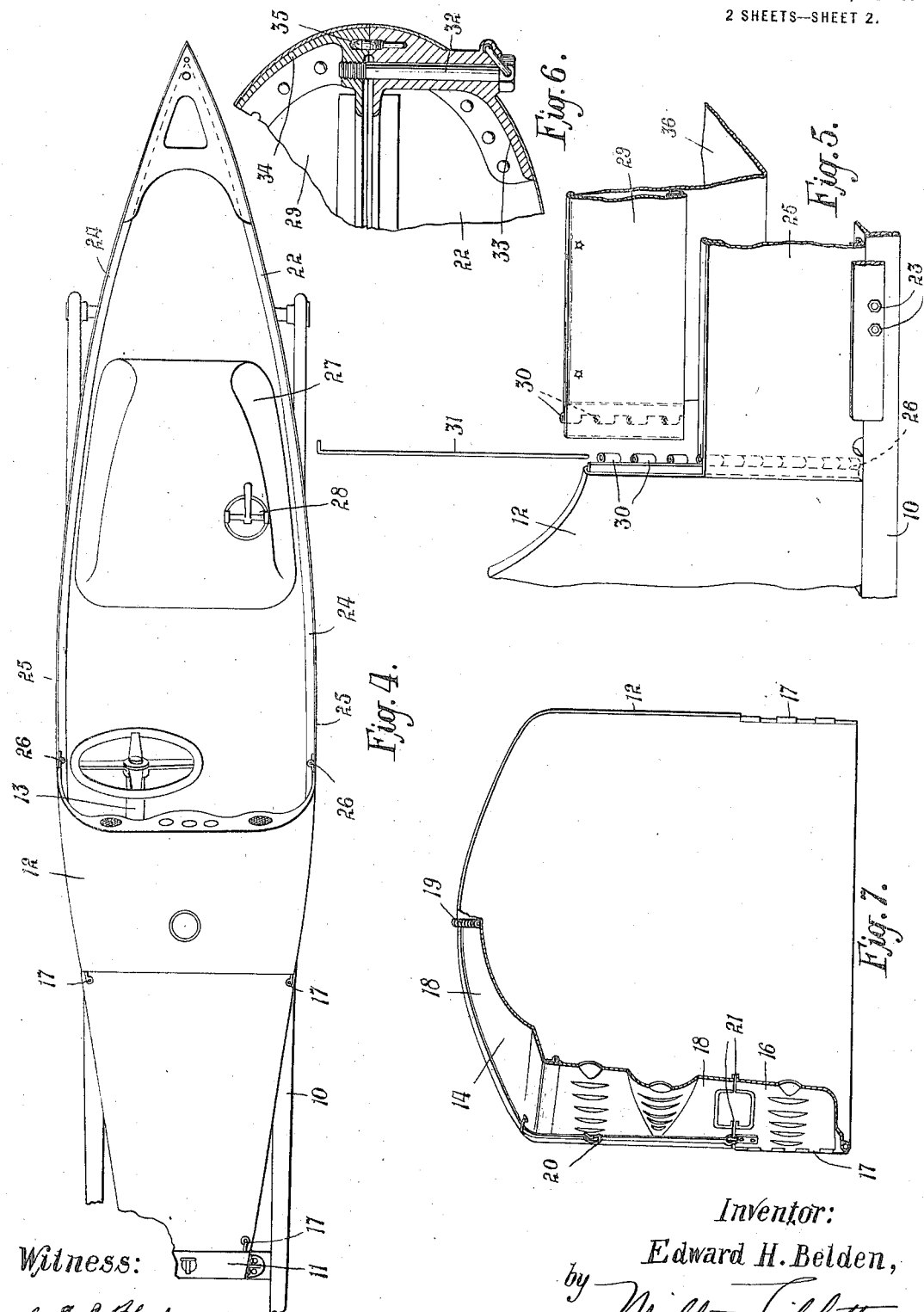

EDWARD H. BELDEN, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,268,083.  Specification of Letters Patent.  Patented June 4, 1918.

Application filed September 14, 1916. Serial No. 120,109.

*To all whom it may concern:*

Be it known that I, EDWARD H. BELDEN, a citizen of the United States, and resident of Detroit, Wayne county, State of Michigan, have invented certain new and useful Improvements in Motor-Vehicles, of which the following is a specification.

This invention relates to motor vehicles and particularly to the body and frame construction and mounting.

One of the objects of the invention is to provide a body of light and simple construction, the upper part of which may be readily removed for easy inspection of the mechanism of the vehicle.

Another objects of the invention is to provide a novel and convenient construction of motor bonnet or casing and the contiguous parts of the vehicle.

Another object of the invention is to provide a novel arrangement of the various parts of the body and frame of a motor vehicle.

Other objects of the invention will appear from the following description taken in connection with the drawings which form a part of this specification, and in which:—

Figure 1 is a plan view of a motor vehicle embodying this invention, the wheels, axles, and some other parts being omitted for the sake of clearness;

Fig. 2 is a side elevation of the vehicle shown in Fig. 1;

Fig. 3 is a side elevation of the upper removable part of the vehicle body shown in Fig. 2;

Fig. 4 is a plan view of the vehicle with the upper part of the body removed;

Fig. 5 is an enlarged detail perspective view illustrating the quick detachable connection between the removable part of the body and the cowl;

Fig. 6 is an enlarged sectional view illustrating the bolted connection between the rear ends of two of the body parts; and Fig. 7 is a front elevation and part sectional view of the bonnet or motor casing.

Referring to the drawings, 10 represents the frame of a motor vehicle which frame may be supported upon the vehicle wheels through suitable springs in the usual way. The frame shown is of somewhat irregular outline, see particularly Fig. 2, the arch near the rear end being for the purpose of providing ample spring action for the rear axle.

Near the front of the frame is supported a radiator 11 and near the middle of the frame is a cowl 12, under which extends the steering post 13. The spaced relation of the radiator 11 and the cowl 12 provides room for the vehicle motor under a bonnet or casing 14. The motor is not shown in the drawings, but it will be understood that it is suitably mounted on the frame and that it has exhaust pipes 15 which extend out through the sides of the bonnet 14. As shown, there are two of these exhaust pipes, one on each side of the vehicle and they may if desired extend practically the length of the vehicle as shown particularly in Fig. 1.

The bonnet 14 is preferably made in sections, there being a lower section 16 secured to the frame on each side and secured also at the front and rear ends to the radiator and cowl respectively, a joint 17 being shown for this purpose. Preferably these are detachable joints. The upper section 18 of the bonnet is preferably formed in two parts hinged together at 19, and extending between and mounted upon the radiator 11 and cowl 12. This section completes the inclosure of the motor and is detachably secured to the lower sections 16 as by the straps 20. The joint 21 between the upper and lower sections of the bonnet is preferably arranged at the exhaust pipe 15 so that the latter extends between the edges of the bonnet sections.

At the rear of the cowl 12, the frame 10 supports a two-part body of novel construction. The lower part 22 of this body is secured directly to the frame 10 as at 23 and the sides of this part of the body extend above the frame and have their upper edges in a horizontal plane as at 24. The forward ends 25 of the sides of this part of the body are secured to the lower rear edge of the cowl 12 as by coöperating lugs 26 and a pin hereinafter described.

A fuel tank 27 is preferably mounted on the frame 10 between the sides of the lower body part and extending somewhat above the upper edge 24 thereof. A filling opening or cap 28 is provided for the fuel tank.

An upper body part 29 is shown particularly in Fig. 3. In Figs. 1 and 2 this body part 29 is shown in position on the vehicle. Its lower edges are in a plane and are adapted to rest on the upper horizontal edges 24 of the lower body part 22. The front end of each side of the upper body part is adapted to be detachably connected to the rear edge of the cowl 12, this connection being shown in detail in Fig. 5. The adjacent edges of the body part and cowl are formed with coöperating lugs 30 which are drilled vertically and through which a pin 31 may pass and thereby secure the two parts together. As shown in Fig. 5, the pin 31 is long enough to extend through the lugs 26 in the lower body part and the adjacent edge of the cowl 12.

The rear ends of the two body parts are detachably secured together by a single bolt 32 which passes through and into suitable reinforcing brackets 33 and 34 of the respective body parts. A dowel pin 35 may be used to properly position the body parts. This rear end connection is shown in detail in Fig. 6.

The upper body part 29 above referred to, when in position on the vehicle, covers and protects the fuel tank 27 and forms a support for the two seats 36 of the vehicle. These seats are secured to and form a part of the body part 29 and the lower parts of them extend downwardly somewhat beyond the lower edge of this body part. Thus when this upper body part is in position the seats drop down into the lower body part in front of the fuel tank. This properly positions the seats relative to the steering post 13. It will be understood that the upper part of the body part 29 is provided with an opening 37 through which the filler cap 28 projects so that the latter is accessible.

By reason of the three-point connection of the upper body part 29 to the vehicle, as above described, said body part may be readily removed by withdrawing the bolt 32 and the two pins 31 thereby making the mechanism of the vehicle quickly accessible. This is of particular importance in connection with racing vehicles, to which type of vehicle the invention is shown applied.

Other forms of the invention may be made within the terms of the claims without departing from the spirit or scope of the invention.

Having thus described my invention what I claim and desire to secure by Letters Patent is:—

1. In a motor vehicle, in combination, a vehicle frame, and a two part body mounted thereon and comprising a lower part having sides secured to the frame and an upper part secured to the lower part and having seats adapted to drop down between the sides of the lower part.

2. In a motor vehicle, in combination, an irregularly shaped frame, a body part mounted thereon and having a plane upper edge, and a body part detachably secured to and resting upon the upper edge of the first body part the second said body part having seats part of which rest between the sides of the first said body part.

3. In a motor vehicle, in combination, a vehicle frame, a cowl mounted on the frame, a lower body part mounted on the frame at the rear of the cowl and connected to the latter and an upper body part mounted on the lower body part and connected to both the cowl and the lower body part.

4. In a motor vehicle, in combination, a vehicle frame, a cowl mounted on the frame, a lower body part mounted on the frame at the rear of the cowl and connected to the latter, a lower bonnet part mounted on the frame forwardly of the cowl, an upper body part mounted upon and secured to the lower body part and to the cowl, and an upper bonnet part secured to the lower bonnet part.

5. In a motor vehicle, in combination, a vehicle frame, a cowl mounted on the frame, a lower body part mounted on the frame at the rear of the cowl and connected to the latter, an upper body part mounted on the lower body part, said cowl and upper body part having coöperating lugs, a pin passing through said lugs and locking them together, and a bolt connection between said body parts at the rear end.

6. In a motor vehicle, in combination, a vehicle frame, a lower body part secured to the frame, a fuel tank mounted on the frame between the sides of the lower body part, an upper body part resting on the lower body part and covering said tank, and means detachably connecting said body parts.

7. In a motor vehicle, in combination, a vehicle frame, a lower body part secured to the frame, a fuel tank mounted on the frame between the sides of the lower body part, an upper body part resting on the lower body part and covering said tank, said upper part having seats dropping down into the lower body part in front of said tank, and means detachably connecting said body parts.

8. In a motor vehicle, in combination, a vehicle frame, a radiator and cowl mounted on the frame in spaced relation, a motor bonnet arranged between the radiator and cowl, said bonnet comprising a lower section secured to the frame and an upper section mounted on the radiator and cowl and detachably secured to the lower section, and an exhaust pipe extending through the bonnet at the joint between said sections.

9. In a motor vehicle, in combination, a vehicle frame, a radiator and cowl mounted on the frame in spaced relation, a motor bonnet arranged between the radiator and cowl, said bonnet comprising a lower section detachably secured to the frame and to the radiator and cowl and an upper section mounted on the radiator and cowl and detachably secured to the lower section and a motor exhaust pipe extending between the edges of the bonnet sections.

In testimony whereof I affix my signature.

EDWARD H. BELDEN.